United States Patent [19]

Schroeder et al.

[11] 4,251,407

[45] Feb. 17, 1981

[54] POLYPROPYLENE COMPOSITIONS

[75] Inventors: Carl W. Schroeder; Joseph R. Webster, both of Houston, Tex.

[73] Assignee: Shell Oil Company, Houston, Tex.

[21] Appl. No.: 939,164

[22] Filed: Sep. 1, 1978

Related U.S. Application Data

[63] Continuation of Ser. No. 671,649, Mar. 29, 1976, abandoned.

[51] Int. Cl.$^3$ ................................................ C08K 3/22
[52] U.S. Cl. ........................... 260/23 R; 260/45.75 W
[58] Field of Search ......... 260/23 EP, 23 R, 45.75 W

[56] References Cited

U.S. PATENT DOCUMENTS

| | | | |
|---|---|---|---|
| 3,111,499 | 11/1963 | Hewck et al. ............... | 260/45.75 W |
| 3,238,163 | 3/1966 | O'Neill et al. .......................... | 260/23 |
| 3,376,250 | 4/1968 | Newland ............................ | 260/42.45 |
| 3,462,389 | 8/1969 | Schulde et al. .................... | 260/42.24 |
| 3,745,142 | 7/1973 | Mahlman ............................ | 260/42.46 |

FOREIGN PATENT DOCUMENTS 819277 9/1959 United Kingdom .

*Primary Examiner*—Melvyn I. Marquis

[57] ABSTRACT

Polypropylene which contains residues of Ziegler catalysts, and especially crystalline polypropylene which contains significant amounts of low molecular weight or atactic polymer, is improved by addition of a very low concentration of finely divided zinc oxide. Such zinc oxide not only acts as acid acceptor, making it possible to omit the conventional calcium stearate acid acceptor, but also interferes with migration of atactic and low molecular weight polymer to the surface, thus preventing plate-out of such material on processing equipment. In the thermal processing of polyproplene compositions containing metal stearate as acid acceptor or organic stearates as antistatic additives, the presence of such zinc oxide in the composition prevents plate-out on processing equipment and improves corrosivity of the compositions; it does not eliminate the antistatic effect.

21 Claims, No Drawings

4,251,407

POLYPROPYLENE COMPOSITIONS

This is a continuation of application Ser. No. 671,649, filed Mar. 29, 1976 and now abandoned.

BACKGROUND OF THE INVENTION

1. Field of the Invention

This invention relates to improved polypropylene compositions containing very small amounts of zinc oxide as a multipurpose additive which acts to make the composition non-corrosive to metal equipment during thermal processing and to prevent plate-out of low molecular weight components on processing equipment during thermal processing.

2. Description of the Prior Art

Polypropylene produced by polymerization of propylene in the presence of so-called Ziegler of Ziegler-Natta catalysts is a well established material of commerce. Commercial polypropylene contains a high proportion of polymer of sterically regular structure and high molecular weight, commonly referred to as "isotactic" polymer, which is insoluble in boiling hexane or heptane and in xylene at ambient temperatures. Commercial polypropylene typically also contains small proportions of material of relatively low molecular weight and material of irregular steric structure, known as atactic polypropylene. Some of these components are soluble in boiling hexane or heptane, and some additional non-isotactic polymer is soluble in xylene at 25° C. Commercial polymer further usually contains small amounts of catalyst residue which includes chloride ions.

It is conventional to stabilize polypropylene against degradation under the influence of heat during processing. Such conventional stabilization systems may contain a phenolic antioxidant together with a synergist such as dialkylthiodipropionate. Polypropylene which is to be employed in outdoor exposure is also conventionally stabilized against deterioration under the influence of actinic light.

In the thermal processing of polypropylene which contains only a heat stabilization system, the presence of chlorine-containing catalyst residue causes liberation of hydrogen chloride during processing with resulting corrosion of metal equipment with which the polymer is in contact, such as molds, extruders, chill-rolls or the like. It has become conventional practice to add calcium stearate to polypropylene compositions as an acid acceptor in concentrations of typically 0.1 to 0.25%.

Compositions containing calcium stearate, particularly those which also contain a relatively high proportion of non-isotactic xylene-extractable components, have the disadvantage that some of the stearate, during processing, may be converted to stearic acid which migrates to the surface and appears to facilitate the migration to the surface of the lower molecular or atactic components of the polypropylene. A similar effect is observed in compositions in which organic stearates, i.e., esters of stearic acid, are present as so-called antistatic additives. The migration of low molecular weight or atactic polymer to the surface during processing results in so-called plate-out of the migrated polymer, i.e. deposition of such low molecular weight and atactic material on the processing equipment, which interferes with proper operation of the equipment. Plate-out is particularly objectionable, for example, in the casting of films, where it deposits on the chill-rolls, and in injection molding where it deposits on the molds.

In polypropylene containing calcium stearate as acid acceptor it is also found that migration of stearic acid to the polymer surface during processing at high temperatures results in some corrosion of processing equipment.

Another situation in which migration of low molecular weight or atactic material or of stearic acid from polypropylene is objectionable is when such polymer is used in the interior of automobiles, where the material vaporizing from the polymer tends to condense on glass surfaces such as the windshield.

Migration of low molecular weight or atactic material or of stearic acid to the surface is also objectionable in polypropylene articles which are to be decorated by printing and, in general, in articles in which a highly glossy surface is desired.

As will be shown below, the present invention is based on the discovery that the presence of small amounts of finely divided zinc oxide in polypropylene not only substantially eliminates corrosivity of the composition, but also prevents undesired plate-out on processing equipment. Zinc oxide used according to the invention also has other incidental beneficial effects, such as a synergistic action with antioxidant and UV stabilization systems.

Zinc is a metal of Group II of the Periodic Table. In 1955, before polypropylene was a material of commerce, it was suggested to add Group II metal compounds, including oxides, to polyolefins containing Ziegler catalyst residue.

U.K. Pat. No. 830,924 to Farbwerke Hoechst, based on a filing in Germany on Apr. 4, 1955, teaches the addition of 0.01 to 3% of inorganic salts or oxides of a metal of Group IIA, IIB or IVB of the Periodic Table to polyethylene to prevent the discoloration and emission of unpleasant odors which occurs during molding of polethylene in the absence of such an additive. The patent also discloses that such inorganic compounds diminish the corrosion of the metal parts that come into contact with the hot plastic mass during processing. The only specific examples in the patent application employ 0.5% of magnesium carbonate and 0.8% of calcium oxide, respectively. Suitable compounds enumerated in the disclosure are sulfates, phosphites, carbonates and oxides of calcium, cadmium, barium, lead, magnesium and zinc.

U.K. Pat. No. 819,277 to The Dow Chemical Company, based on an application filed in the U.S. on Dec. 19, 1955, discloses the addition to olefinic materials, polymerized with Ziegler catalyst, of a corrosion-inhibiting quantity of a basic inorganic compound of a Group II metal of the Periodic System which has a receptor function for and is capable of counteracting hydrogen halide and like corrodents. The disclosure is essentially in terms of polyethylene. The patent discloses addition of the corrosion-inhibiting material in amounts of 0.005 to 5% by weight and suitably 0.5 to 2% by weight. The basic compounds disclosed as useful are the oxides and hydroxides of the Group II metals. It is stated that the metals are "calcium, magnesium, strontium, barium and zinc, in descending order of desirability". A single example illustrates the effect on the corrosivity of polyethylene of adding, respectively, 1.5% by weight of calcium oxide, magnesium oxide, barium oxide and zinc oxide and 2% of calcium hydroxide. Evidence of corrosion with the calcium compounds is stated to be "none"

and with the magnesium, barium or zinc oxides "negligible".

In spite of these early disclosures bearing on the use of zinc oxide as halogen acceptor, the industry did not turn to the use of zinc oxide but appears to be generally employing calcium stearate as acid acceptor in polypropylene produced with Ziegler catalysts. However, a commercial use of zinc oxide in polypropylene is as a ultraviolet screener, employed in concentrations of 3 to 10 phr (parts per hundred parts of resin) together with a synergist. Several materials are known as synergists for zinc oxide in this use, including titanium dioxide and zinc dithiocarbamates.

Other uses for zinc oxide in polyolefins, disclosed in the patent literature, are in the stabilization of ethylene-propylene copolymers, using 0.1 to 5% of zinc oxide in combination with sulfur or other Group VI elements, the zinc oxide absorbing the $H_2S$ or equivalent, liberated during thermal processing (U.S. Pat. No. 3,111,499); as one of a large group of organic and inorganic bases employed in combination with thiophosphites or the like to provide thermal and light stabilization (U.S. Pat. No. 3,179,621); as one of the group of "anionic exchange or basic substances" including oxides, hydroxides or longe chain fatty acid salts of alkaline earth metals, tin and zinc, metal soaps being preferred, in combination with an acidic ultraviolet-absorbing agent to provide UV stability (U.S. Pat. No. 3,238,163); as one of the salts, acids, oxides, soaps and hydroxides of 21 named metals to improve the corrosivity of polyolefins (U.S. Pat. No. 3,331,806); in concentration of 0.25 to 10%, together with zinc dibutyldithiocarbamate with either 2,6-didodecyl-p-cresol or dilaurylthiodipropionate to provide a white, light stable composition (U.S. Pat. No. 3,376,250); in concentrations of 10 to 100% as filler for polypropylene (U.S. Pat. No. 3,462,389); and as one of a group of inorganic fillers in concentration from 50 to 1900% based on polypropylene (U.S. Pat. No. 3,745,142).

SUMMARY OF THE INVENTION

This invention comprises the use of very low concentrations of finely divided zinc oxide in polypropylene. In polypropylene which contains corrosion-causing amounts of Ziegler catalyst residue, the zinc oxide may be present as sole acid acceptor, but it also improves the corrosivity of polypropylene compositions which contain conventional calcium stearate as acid acceptor. In polypropylene which contains a relatively high concentration of low molecular weight or atactic components, such as at least about 3% soluble in xylene at 25° C., the presence of zinc oxide in accordance with the invention significantly reduces or eliminates plate-out on processing equipment. Zinc oxide also reduces or eliminates plate-out due to the presence of salts and esters compounds of long chain fatty acids, such as stearates, in polypropylene, especially polypropylene containing a relatively high concentration of low molecular weight or atactic polymers. The present invention can be practiced in several modes, since the zinc oxide employed according to the invention is capable of serving the separate function of corrosivity reduction or prevention and plate-out reduction or prevention, either separately or in combination.

In accordance with the present invention, from 0.01 to less than 0.1% by weight of zinc oxide of small particle size is combined with polypropylene which is conventionally stabilized against degradation under the influence of heat and which additionally contains at least one of (i) a corrosion-causing amount, typically in the range from 20 to 100 ppm, of chlorine, present as residue of a Ziegler type polymerization catalyst;

(ii) at least 3% of xylene-soluble low molecular weight or atactic polypropylene; and (iii) an amount of an inorganic salt or of an ester of a long chain fatty acid, such as a stearate, which results in plate-out during thermal processing.

The present invention also comprises a method of preventing corrosion of processing equipment and plate-out of lower molecular weight components in the thermal processing of polypropylene compositions which contain a corrosion-causing amount up to about 100 ppm chlorine, present as residue of a Ziegler type polymerization catalyst, and at least about 3% by weight atactic or low molecular weight xylene soluble polymer, conventionally stabilized against degradation under the influence of heat, by incorporating in the composition, prior to thermal processing, from 0.01 to less than 0.1% by weight of finely divided zinc oxide.

DESCRIPTION OF THE PREFERRED EMBODIMENTS

This invention is directed to conventionally stabilized polypropylene compositions which are modified by the addition of finely divided zinc oxide in very low concentration to achieve certain improvements. Some of the advantages accruing to the use of zinc oxide in accordance with this invention are as follows:

Mold corrosion is eliminated. Products according to this invention have corrosivities of A− to B+ compared to C+ to D+ when calcium stearate is employed as acid acceptor in polypropylene which contains corrosion-causing amounts of catalyst residue.

The water absorption of the product is lower than that of comparable products containing calcium stearate as acid acceptor.

Static charges are not generated during processing; the products are, therefore exceptionally useful in the manufacture of film extruded and quenched in a water bath and other products which are extruded into water baths, such as 2×100 mil tape and drinking straws.

Water carryover on film leaving a quenching water bath is substantially eliminated; this results in elimination of strand breakage when such film is slit into tape widths and then stretched in an oven.

Molded articles manufactured from products according to this invention do not have a film of stearic acid on the surface and can therefore be decorated by printing, vacuum metallizing etc.

Plate-out during injection molding is reduced or practically eliminated in both regular and antistat grades, making products produced from polymer compositions according to this invention useful in high-gloss applications.

Plate-out is also reduced in the chill-roll extrusion of film, giving products with improved surface gloss.

The "fogging" of glass surfaces in automobiles, which is experienced with products containing low molecular weight components which vaporize under the influence of high temperatures in the automobile, is eliminated in compositions according to this invention.

The polypropylene substrate which is employed in compositions of this invention is conventional commercial polypropylene, produced by polymerizing propylene with conventional Ziegler-Natta type catalysts such as combinations of gamma titanium trichloride or compositions containing it, with aluminum alkyls such as aluminum diethyl monochloride. Various such systems of titanium trichloride compositions and aluminum alkyl compounds are in commercial use for production of polypropylene. Depending on the method of manufacture, commercial propylene polymers may contain more or less catalyst residue and atactic and low molecular weight material which is extractable with boiling hydrocarbons such as hexane or heptane and soluble in xylene at 25° C.

Catalyst residue typically comprises some titanium and aluminum and some chlorine, present as chloride. Except in highly purified polymers, the amount of chlorine present is enough to cause corrosion of metal processing equipment during thermal processing. For purposes of this specification, "corrosion-causing" amounts of catalyst residue are considered to be those which analyze from about 10 to 100 ppm of chlorine by titration of unstabilized polymer powder.

The use of zinc oxide according to the present invention is particularly advantageous with propylene polymers which contain a relatively high proportion of xylene-soluble material, which tends to lead to problems such as plate-out and fogging. The invention is, thus, particularly advantageous for polypropylene compositions containing in excess of 3% of components soluble in xylene at 25° C. Xylene extractables do not normally exceed about 8%.

The xylene extraction test is carried out as follows:

A polypropylene sample is completely dissolved in oxidation-inhibited "five-degree xylene" (ASTM D-845) by stirring at reflux. The solution is cooled down to 25° C. in a water bath, during which the insoluble portion precipitates. The precipitate is filtered off and the amount of "xylene-solubles" determined by weighing the residue remaining after evaporation.

The form in which the zinc oxide is employed in the present invention is important. It has been found that not all zinc oxides are suitable for use according to this invention. Very suitable is a commercial zinc oxide sold by the New Jersey Zinc Company under the tradename KADOX ®-25 which has the following typical properties:

A zinc oxide grade of 99.5% purity but one micron mean particle size was found to adversely affect tensile strength and Izod impact strength of a polypropylene composition in which it was employed, as well as imparting a gritty feeling to film made from the composition. Compositions made with this one micron zinc oxide did not prevent plate-out.

If zinc oxide is employed solely as acid acceptor, e.g., in polypropylene which contains more than 10 ppm chlorides as catalyst residue but is low in xylene-solubles, it may be effective in concentrations as low as 0.005% but is suitably present in at least 0.01% concentration. The stiochiometric proportion is $2.5 \times 10^{-4}\%$ by weight per 1 ppm chloride, but at least double the stiochiometric account is generally desirable. At concentrations of 0.05% and above, the presence of zinc oxide may interfere noticeably with the optical properties of the finished article, whether pigmented, dyed or natural. Even lower amounts, such as 0.03%, are generally sufficient to provide the desired protection both against corrosion and plate-out.

The broadest range of zinc oxide used in the present invention is from 0.005 to less than 0.1%, e.g., about 0.08% and preferably from 0.01% to 0.05% or from 0.01% to 0.03% where optical properties of the product are important.

Zinc oxide employed in accordance with the present invention is compatible with the use of conventional polypropylene stabilization systems.

Unstabilized polypropylene is highly susceptible to oxidative degradation. The oxidation is a free-radical chain reaction accelerated by heat and actinic radiation. It leads to breakdown of the long polymer chains, making the composition weak and brittle. The stabilizer system required to prevent or retard oxidation depends on the processing conditions, manufactured item, end-use environment and length of service required. Numerous commercial stabilization systems are in use and are well known to persons skilled in this art.

Execellent thermal antioxidants are the hindered alkyl phenols, exemplified by 2,6-di-tert-butylphenol, 4,4'-bis(2,6-di-tert-butylphenol, octadecyl 3-(3,5-di-tert-butyl-4-hydroxyphenyl)-propionate, and tetrakis[methylene 3-(3',5-di-tert-butyl-4'-hydroxyphenyl)pro-

| Physical Properties | | Chemical Analysis | |
| --- | --- | --- | --- |
| Mean Particle Size (microns) | 0.11 | ZnO | 99.7% |
| Surface Area | | | |
| (sq. meters/gram) | 10 | PbO | 0.001 |
| Through 325 Mesh Screen | 99.99% | CdO | 0.001 |
| Package Density (lbs./ft.$^3$) | 30 | As$_2$O$_3$ | <0.00005 |
| Specifications | ASTM D-79 | Total S as SO$_3$ | 0.003 |
| Fed. Spec. | TT-P-463a (Grade B) | H$_2$O Soluble Salts | 0.02 |
| Food and Drug Administration | | | |
| | | Loss at 110° C. | 0.2 |
| | | Insoluble in HCl | <.01 |

Other forms of zinc oxide which have been found suitable for use in this invention are USP grade and analytical grade zinc oxide powders.

The above grade of zinc oxide was found to be superior in degree of improvement of corrosivity to a 99% pure grade of zinc oxide having a 0.3 micron mean particle size, another having a purity of 99.8% and 0.21 micron mean particle size and an acicular zinc oxide of 99.2% purity having a particle size of 0.24 microns. These grades were not tested for their effect on plate-out.

pionate]methane. Such antioxidants are frequently used with hydroperoxide decomposers such as alkyl 3,3'-thiodipropionate which act as a synergist for phenolic antioxidants in preventing decomposition of the hydroperoxides in a manner which would lead to breakdown of the polymer. Most commercial polypropylene compositions contain a mixture of stabilizers consisting of a phenolic oxidation inhibitor and a hydroperoxide decomposer.

To protect the polymer against ultraviolet radiation, an ultraviolet absorber such as various derivatives of hydroxybenzophenone, hydroxyphenylbenzotriazole or phenylsalicyate is employed.

Other additives are required for special applications. Of particular interest are additives which impart antistatic properties to polymer articles. Typical so-called antistats are stearate esters such as glycerol monostearate. An essential ingredient in polypropylene which contains corrosion-causing amounts of catalyst residues is an acid accepting compound. The conventional one used in most commercial polypropylenes is calcium stearate, typically employed in concentrations of about 0.1% to 0.25%. In the absence of an acid acceptor, heating of the polypropylene composition near or above its melting point results in liberation of hydrogen chloride which is vaporized from the polymer and corrodes metallic surfaces of the equipment in which the polymer is processed. Heating of compositions containing calcium stearate results essentially in reaction of the hydrogen chloride with calcium stearate to form calcium chloride and stearic acid. The stearic acid is not as volatile as hydrogen chloride and, hence, the amount of acid vaporized from the polymer is reduced. Stearic acid is also not as extremely corrosive as hydrogen chloride. Stearic acid tends to condense on cooler metallic surfaces, becoming part of the so-called plate-out.

Use of zinc oxide as the sole acid acceptor or in combination with calcium stearate in compositions according to this invention results in significant improvement in corrosivity compared to compositions in which calcium stearate is employed as sole acid acceptor. Liberated hydrogen chloride reacts with zinc oxide to form zinc chloride, which remains in the polymer. Zinc oxide is useful in combination with calcium stearate in that it has been found to interfere with the migration of low molecular weight components, including stearic acid, to the surface of the polymer; hence, the presence of zinc oxide serves to reduce the corrosivity and plate-out experienced with calcium stearate-stabilized composition.

The invention is illustrated by reference to the following examples:

In these examples, the polypropylene employed was a commercial polypropylene prepared with a titanium trichloride-aluminum diethyl chloride catalyst system and having about 35 ppm chloride content measured by titration of the powder.

Antioxidant stabilizer systems A, B and C are formulations based on commercial antioxidants tetrakis[methylene 3-(3',5'-di-tert-butyl-4'-hydroxyphenyl)propionate]methane, 2,6-di-tert-butylphenol and 1,3,5-tris(3,5-di-tert-butyl-4-hydroxybenzyl)mesitylene, some also containing a dialkylthiodipropionate.

The zinc oxide was KADOX-25 ® whose properties are listed above.

The plate-out was determined by extruding polymer compositions through a film die onto a chill-roll and measuring the percent reflectance of the surface of the chill-roll. Plate-out resulted in reduced reflectance. The procedure was as follows:

Fifty-pound samples of each product were prepared by drum tumbling the required additives with the substrate polymer powder. Extrusion was carried out on a 2½ inch extruder using a nitrogen purge, 1,000 psi back pressure and a 450° F. melt temperature. The pellets produced were drum tumbled to give a homogenous mixture.

Plate-out testing was carried out on an extruder equipped with a film die. The extruder operated at 520° F. melt temperature, 25 rpm screw speed and 2,500 psi back pressure. The polymer was extruded onto a 70° F. water-cooled chill-roll running at 100 rpm.

Plate-out was determined by measuring the percent reflectance of the surface of the chill-roll on which the film was being extruded with a Gardner Glossmeter. As plate-out continues to increase on the chill-roll, the percent reflectance is reduced from 100% to as low as 10% reflectance. The device used rides uniformly on the chill-roll while measuring the plate-out and is held steady over a period of 180 seconds. The experiment is started with the air knife on, which normally keeps the chill-roll clean. It is turned off when the taking of data is started.

Corrosivity of polypropylene was determined by a method in which 30±0.5 grams of polymer is melted in a glass cup and a mild steel disc, cooled by 65° F. cooling water, is held about ½ inch above the polymer surface while the molten polymer is maintained at 500°±10° F. for one half hour. The disc is then visually examined, rinsed with acetone, and examined microscopically.

Corrosivity is rated on the following scale:

| Corrosivity Rating | Area of Disk Corroded, % | Disk Appearance |
|---|---|---|
| A | 0 | No corrosion visible under 30 powder magnification. |
| B | > 0 to < 1 | Trace corrosion, not readily visible to naked eye. |
| C | > 1 to < 5 | Mild corrosion plainly visible to naked eye. |
| D | > 5 to < 15 | Most of area marked with small spots, usually a few spots the size of a pinhead. |
| E | > 15 to < 30 | Heavily corroded, many large spots. |
| F | > 30 | Very badly corroded. |

EXAMPLE I

Several compositions were tested for plate-out and corrosivity by the above-described procedures. The results are shown in the following Table 1.

TABLE 1

| Sample | Composition | | Acid Acceptor | | Corro-sivity | Plate-Out - % Reflectance | | | |
|---|---|---|---|---|---|---|---|---|---|
| | Antioxidant | % wt Antistat | Name | % w | | 30 sec | 60 sec | 90 sec | 180 sec |
| I-1 | None | 0 | None | 0 | D to C⁻ | 83 | 63 | 55 | 50 |
| I-2 | A | 0 | CaSt₂ | 0.20 | C⁻ to B | 45 | 33 | 32 | 23 |
| I-3 | A | 0 | ZnO | 0.05 | B+ | 100 | 100 | 100 | 100 |
| I-4 | B | 0 | ZnO | 0.05 | A | 100 | 100 | 99 | 98 |
| I-5 | C | 0 | ZnO | 0.05 | A | 100 | 99 | 99 | 97 |
| I-6 | B | 0.25 | CaSt₂ | 0.10 | C to B⁻ | 55 | 30 | 22 | 16 |
| I-7 | B | 0.25 | ZnSt₂ | 0.10 | C⁺ | 50 | 38 | 35 | 30 |

TABLE 1-continued

| | Composition | | Acid Acceptor | | Corro- | Plate-Out - % Reflectance | | | |
|---|---|---|---|---|---|---|---|---|---|
| | | % wt | | | | | | | |
| Sample | Antioxidant | Antistat | Name | % w | sivity | 30 sec | 60 sec | 90 sec | 180 sec |
| I-8 | B | 0.25 | ZnO | 0.05 | B+ | 88 | 53 | 40 | 28 |

It is seen that the use of 0.05% of zinc oxide in compositions containing any of three antioxidant stabilizer systems resulted in complete or substantially complete prevention of plate-out (I-3, I-4, and I-5). A conventionally stabilized system containing calcium stearate resulted in very considerable plate-out after as little as thirty seconds (I-2). A system containing no antioxidant and no calcium stearate showed less plate-out than the calcium stearate-containing composition (I-1).

Runs I-6, I-7 and I-8 were carried out with compositions containing an antistat additive. In other experiments, it had been determined that glycerol monostearate plates out at a relatively slower rate than another glycerol stearate system and, therefore, glycerol monostearate was employed in this test. Run I-6 illustrates the extreme level of plate-out resulting from using glycerol monostearate in combination with calcium stearate. Run I-7 shows that some improvement in plate-out is obtained by employing zinc stearate instead of calcium stearate. Run I-8 illustrates the use of zinc oxide as acid acceptor in this system. It is seen that the rate of plate-out is greatly reduced as indicated by the reflectance readings at 30 and 60 seconds. Thus, while zinc oxide does not prevent plate-out in such systems, it provides substantial improvement in commercial systems due to its effectiveness in reducing the rate of plate-out.

The corrosivity ratings illustrate that 0.05% zinc oxide (I-3) provides better protection against equipment corrosion than 0.2% calcium stearate (I-2). A rating of B+ is nearly as good as A. Thus, examples I-3, I-4 and I-5 demonstrate excellent corrosion protection by 0.05% zinc oxide.

In the presence of glycerol monostearate antistat, 0.05% zinc oxide (I-8) again provided greatly superior corrosion protection compared to calcium stearate (I-6) and also zinc stearate (I-7). In this specification and in the claims, all percentages are by weight unless otherwise stated.

EXAMPLE 2

In comparable tests, samples of polypropylene containing 0.05% KADOX-25 ® zinc oxide, gave corrosivity ratings of A. Samples containing 0.05% of other zinc oxides, one having a purity of 99% and mean particle size of 0.21 micron and the other 99.8% purity and particle size of 0.3 micron gave corrosivity ratings of B.

EXAMPLE 3

The effectiveness of zinc oxide in improving the corrosivity of samples containing calcium stearate is illustrated by the following data in Table 2 obtained in polymer and with zinc oxide as used in Example 1.

TABLE 2

| Sample | Antioxidant | Antistat | % w CaSt | % w ZnO | Corrosivity |
|---|---|---|---|---|---|
| II-1 | A | 0 | 0.10 | 0 | C− to B |
| II-2 | A | 0 | 0.10 | 0.03 | B to A− |
| II-3 | A | 0 | 0.10 | 0.05 | A |
| II-4 | A | 0 | 0.05 | 0.05 | B+ to A |

We claim:

1. Improved polypropylene composition comprising essentially a substrate of polypropylene containing a high proportion of stereoregular propylene polymer which is insoluble in xylene at ambient temperature and containing at least one of (i) a corrosion-causing amount up to about 100 ppm of chlorine present as residue of a Ziegler type polymerization catalyst, (ii) at least 3% of xylene-soluble propylene polymer; and (iii) an amount of salt or ester of long chain fatty acid which results in plate-out during thermal processing of said substrate, said composition being conventionally stabilized against degradation under the influence of heat, and containing from 0.005 to 0.05 percent by weight of zinc oxide having a mean particle size no greater than 0.3 micron.

2. A composition according to claim 1, containing a conventional stabilizer against actinic radiation.

3. Improved polypropylene composition consisting essentially of polypropylene prepared with a Ziegler type catalyst, containing a high proportion of stereoregular propylene polymer which is insoluble in xylene at ambient temperature and at least 3% by weight of xylene-soluble propylene polymer, conventional stabilizer against degradation under the influence of heat, and from 0.005 to 0.05% by weight of zinc oxide having a mean particle size no greater than about 0.3 micron.

4. A composition according to claim 1 wherein the mean particle size of said zinc oxide is about 0.11 micron.

5. Improved polypropylene composition consisting essentially of isotactic polypropylene prepared with a Ziegler type catalyst, containing a corrosion-causing amount up to about 100 ppm of chlorine present as catalyst residue, at least 3% by weight of xylene-soluble propylene polymer and conventional stabilizer against degradation under the influence of heat, and from 0.005 to 0.05% by weight of zinc oxide having a mean particle size no greater than about 0.3 micron.

6. A composition according to claim 5 wherein the mean particle size of said zinc oxide is about 0.11 micron.

7. Improved polypropylene composition consisting essentially of a substrate of polypropylene prepared with a Ziegler type catalyst, said substrate containing a corrosion-causing amount up to about 100 ppm of chlorine present as catalyst residue, conventional stabilizer against degradation under the influence of heat, an amount of salt or ester of long chain fatty acid which results in plate-out during thermal processing of said substrate, and from 0.005 to 0.05% by weight of zinc oxide having a mean particle size no greater than about 0.3 micron.

8. A composition according to claim 7 wherein said salt is calcium stearate.

9. A composition according to claim 7 wherein said ester is an ester of stearic acid which imparts antistatic properties.

10. A composition according to claim 7 wherein the mean particle size of said zinc oxide is about 0.11 micron.

11. Improved polypropylene composition consisting essentially of a substrate of polypropylene prepared with a Ziegler type catalyst, said substrate containing a high proportion of stereoregular propylene polymer which is insoluble in xylene at ambient temperature and a corrosion-causing amount up to about 100 ppm of chlorine present as catalyst residue and at least 3% by weight of xylene-soluble propylene polymer, conventional stabilizer against degradation under the influence of heat, an amount of salt or ester of long chain fatty acid which results in plate-out during thermal processing of said substrate, and from 0.005 to 0.05% by weight of zinc oxide having a mean particle size no greater than about 0.3 micron.

12. A composition according to claim 11 wherein said salt is calcium stearate.

13. A composition according to claim 11 wherein said ester is an ester of stearic acid which imparts antistatic properties.

14. A composition according to claim 11 wherein the mean particle size of said zinc oxide is about 0.11 micron.

15. The method of stabilizing against causing corrosion of processing equipment and against plate-out of lower molecular weight components in thermal processing, a polypropylene composition containing a high proportion of stereoregular propylene polymer which is insoluble in xylene at ambient temperature and a corrosion-causing amount up to about 100 ppm of chlorine present as residue of a Ziegler type polymerization catalyst and at least about 3% by weight atactic or lower molecular weight propylene polymer soluble in xylene at 25° C., said composition being conventionally stabilized against degradation under the influence of heat, which comprises incorporating in said composition from 0.005 to 0.05 percent by weight of zinc oxide having a mean particle size no greater than about 0.3 micron.

16. The method according to claim 15 wherein the particle size of said zinc oxide is about 0.11 micron.

17. The method according to claim 15 wherein said composition contains up to 1% of at least one stearate compound.

18. The method of preventing corrosion of processing equipment and plate-out of lower molecular weight components in the thermal processing of polypropylene compositions containing a high proportion of stereoregular propylene polymer which is insoluble in xylene at ambient temperature and a corrosion-causing amount up to about 100 ppm chlorine, present as residue of a Ziegler type polymerization catalyst, and at least about 3% by weight xylene-soluble propylene polymer, conventionally stabilized against degradation under the influence of heat, which comprises incorporating in the polypropylene composition, prior to said thermal processing, from 0.005 to 0.05% by weight of zinc oxide having a mean particle size no greater than about 0.3 micron.

19. The method according to claim 18 wherein the particle size of said zinc oxide is about 0.11 micron.

20. The method according to claim 18 wherein said composition contains up to about 1% of at least one stearate compound.

21. A composition according to claim 1 wherein the mean particle size of said zinc oxide is about 0.11 micron and its concentration is selected in the range from 0.005 to 0.03 percent to be below that which adversely affects the optical properties of the composition.

* * * * *